United States Patent [19]

Ohhashi

[11] Patent Number: 4,573,137
[45] Date of Patent: Feb. 25, 1986

[54] ADDER CIRCUIT

[75] Inventor: Masahide Ohhashi, Sagamihara, Japan

[73] Assignee: Tokyo Shibaura Denki Kabushiki Kaisha, Japan

[21] Appl. No.: 414,833

[22] Filed: Sep. 3, 1982

[30] Foreign Application Priority Data

Nov. 27, 1981 [JP] Japan .............................. 56-190122

[51] Int. Cl.$^4$ .............................................. G05F 7/50
[52] U.S. Cl. .................................................. 364/788
[58] Field of Search ........................ 364/787, 786, 788

[56] References Cited

U.S. PATENT DOCUMENTS

| 3,553,446 | 1/1971 | Kruy ................................... | 364/788 |
| 3,728,532 | 4/1973 | Pryor .................................. | 364/787 |
| 3,767,906 | 10/1973 | Pryor .................................. | 364/786 |
| 4,139,894 | 2/1979 | Reitsma .............................. | 364/788 |

FOREIGN PATENT DOCUMENTS 0964375  3/1975  Canada ............................... 364/788

OTHER PUBLICATIONS

Anderson, "Five-Level Combinations Sum Predict and Carry Propagate Adder", IBM Technical Disclosure Bulletin, vol. 14, #1, Jun./1971, pp. 112–113.
"Computer Arithmetic: Principles, Architecture, and Design", K. Hwang, Chapter 3, Sec. 7, Carry-Select Adders, p. 82, FIG. 3.7 (John Wiley & Sons, 1979).

Primary Examiner—James D. Thomas
Assistant Examiner—Dale M. Shaw
Attorney, Agent, or Firm—Finnegan, Henderson, Farabow, Garrett & Dunner

[57] ABSTRACT

In an adder circuit in which the input data is divided into a plurality of bit blocks each consisting of a plurality of bits for parallel data processing, two adder sections with the carry inputs thereto respectively set to logic "0" and "1" are provided for each of the blocks other than the LSB block. The sum and carry outputs from each section in each block are commonly connected through a gate circuit, which is controlled by a carry output from the next lower bit block.

5 Claims, 3 Drawing Figures

F I G. 2
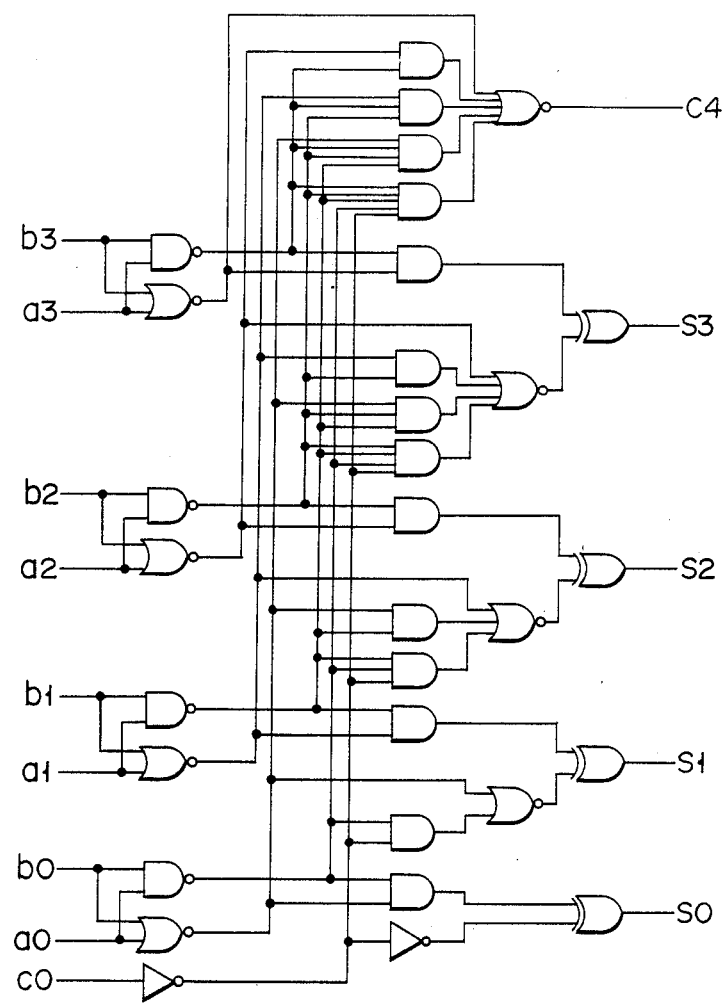

ADDER CIRCUIT

BACKGROUND OF THE INVENTION

This invention relates to an adder circuit based on a carry look-ahead system.

Adder circuits which are included in computers' central processor units or the like are usually required to operate at high speeds. In adders which are based on a ripple carry system, the propagation of a carry takes considerable time, which is undesirable. Today, adders which are based on a carry look-ahead system are used extensively. A carry select adder, which is shown in FIG. 3.7, page 82 of "Computer Arithmetic: Principles, Architecture, and Design" by K. Hwang (John Wiley & Sons. Inc., 1979) is an example of a prior art carry look-ahead adder. In this adder, a 16-bit input data is divided into four sections each of 4 bits, and two adders are used for each section. Of the two adders, the carry input to one adder is fixed to logic "0" while the carry input to the other is fixed to logic "1". Either one of the sum outputs of the two adders are selected by a multiplexer. The multiplexer is controlled by a carry selector, which has logic elements receiving the output carry from each section adder. In such an adder, the construction of the carry selector is not the same for all the sections, but higher bit sections have more complicated constructions. This presents difficulties in the pattern design when integrating the circuit. Further, where a MOS construction is adopted, a large number of fan-outs of the carry output occur, which reduces speed.

SUMMARY OF THE INVENTION

An object of the invention is to provide an adder circuit based on a carry look-ahead system, in which the carry can be effected by a simple construction.

The above object can be attained by an adder circuit which comprises a first adder section for receiving first and second input data from a least significant bit up to an Nth bit (N is a predetermined integer) and a carry input and producing a sum of the received first and second input data and a carry, a second adder section for receiving first and second input data from an (N+1)th bit up to a most significant bit and a carry input fixed to logic "0" and producing a sum of the received first and second input data and a carry, a third adder section for receiving the same first and second input data as received by the second adder section and a carry input fixed to logic "1" and producing a sum of the received first and second input data and the carry, and a selector connected to the output terminals of the second and third adder sections, for selectively providing the sum and carry outputs of either one of the second and third adder sections according to the carry output from a next lower bit side adder section.

BRIEF DESCRIPTION OF THE DRAWINGS

FIG. 2 is a circuit diagram showing an example of an adder section in the same.

DETAILED DESCRIPTION OF THE PREFERRED EMBODIMENTS

Figure 1:
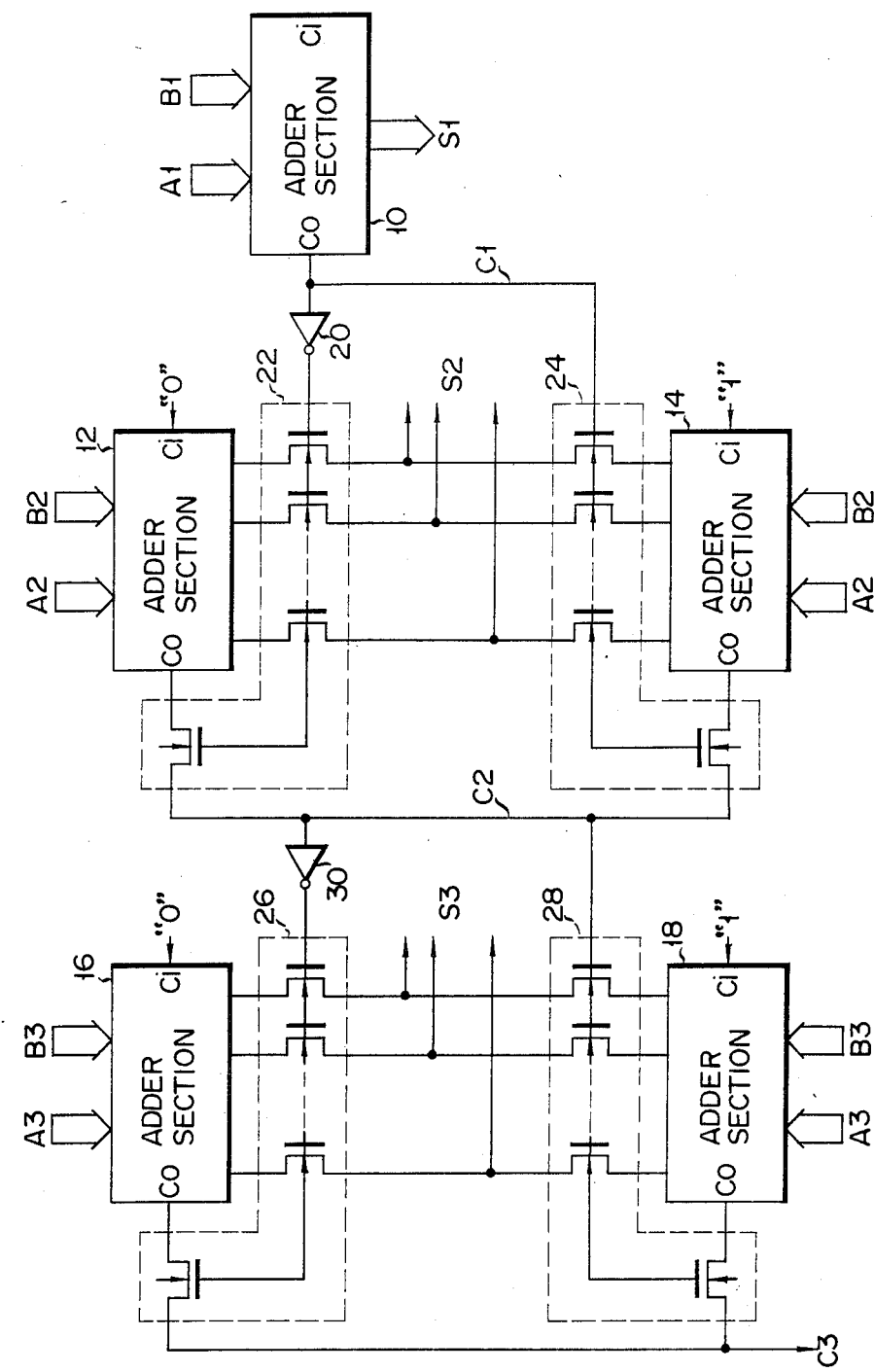
FIG. 1 is a block diagram showing an embodiment of the adder circuit according to the invention.

Now, an embodiment of the adder circuit according to the invention will be described with reference to the accompanying drawings. FIG. 1 is a block diagram showing one embodiment of the circuit. It is assumed that the first and second parallel input data A and B to be added together are uniformly divided into three bit blocks, which are expressed as parallel data A1, B1, A2, B2 and A3, B3 from the LSB side. The parallel sum of the parallel input data A and B is represented by sum S1 of data A1 and B1, S2 of data A2 and B2, and sum S3 of data A3 and B3. The carry output is represented by a carry C3.

The input data A1 and B1 in the LSB block are supplied to an adder section 10. The input data A2 and B2 in the next upper bit block are supplied to both adder sections 12 and 14. The input data A3 and B3 in the MSB block are supplied to both adder sections 16 and 18. The adder sections 10, 12, 14, 16 and 18 may have any construction such as a ripple carry adder, a ROM, etc. so long as the addition of data consisting of a plurality of bits can be done.

FIG. 2 shows an example of the adder section, which is a 4-bit carry look-ahead adder. In the drawing, it is designated at c0 a carry input, a0 to a3 and b0 to b3 data inputs, s0 to s3 sum outputs, and c4 a carry output. The carry input to the LSB block adder section 10 is usually "0". However, when there is a carry from a lower bit such as in the double-precision calculation, this carry signal is set to the carry input. The carry input to the adder sections 12 and 16 is fixed to logic "0", while the carry input to the adder sections 14 and 18 is fixed to logic "1". The outputs, both sum and carry outputs of the adder sections 12, 14, 16 and 18 are supplied to gate circuits 22, 24, 26 and 28 each including N-channel MOSFETs.

The carry output C1 of the adder section 10 is supplied to a control terminal of the gate circuit 24, and is also supplied through an inverter 20 to a control terminal of the gate circuit 22. The output terminals of the gate circuits 22 and 24 including the carry output terminals for each bit are commonly connected in wired-OR connection, and a sum S2 and a carry C2 can be obtained from common junctions. The carry C2 is supplied to a control terminal of the gate circuit 28, and is also supplied through an inverter 30 to a control terminal of the gate circuit 26. The output terminals of the gate circuits 26 and 28 including the carry output terminals are commonly connected for each bit in the wired-OR connection, and a sum S3 and a carry C3 can be obtained from the common junctions. Each of the gate circuits 22, 24, 26 and 28 is a MOS transmission gate.

The operation of the embodiment will now be described. The input data A and B are supplied to the predetermined adder sections, and the carry input is supplied to the carry input terminal of the adder section 10. From the individual adder sections 10, 12 14, 16 and 18 the sum and carry outputs are obtained almost simultaneously. If the carry output signal from the LSB block adder section 10 is logic "1", the MOSFETs in the gate circuit 24 are rendered conductive while the MOSFETs in the gate circuit 22 are rendered nonconductive. Thus, the output signal of the adder section 14, the carry input to which is fixed to logic "1", becomes effective. This sum output is provided as the output S2. The carry output of the adder section 14 is provided as the carry signal C2. Likewise, one of the adder sections 16 and 18 is selected depending upon whether the signal C2 is logic "1" or "0".

In the embodiment described above, parallel input data A and B are divided each into a plurality of bit blocks. Each of the blocks resulting from data A is added by two adders to the corresponding block resulting from data B. The carry input of one of the adders is fixed to logic "0", and that of the other adder is fixed to logic "1". Thus, the calculation period is reduced by permitting the outputs, including sum and carry outputs from the two adders of each block, to be selected by the MOS transmission gates, which are controlled by the carry output from the next lower bit block. The period required for the calculation is the sum of the period required to obtain the carry output C1 of the LSB block adder circuit 10 and the period required until the carry output C3 of the MSB block is obtained after the output C1 has been obtained.

In the above embodiment, the latter period is the sum of the propagation periods in the two inverter stages and two MOS transmission gate stages. Further, in the above embodiment, the circuit for selecting one of the two adder sections has the same construction in blocks other than the LSB block. Thus, when designing an integrated circuit, the same pattern can be used repeatedly to reduce the time required for the design. Further, the selecting circuit can be realized by a simpler circuit having a smaller number of elements such as MOS transmission gates. Thus, the design can be achieved more easily.

Figure 3:
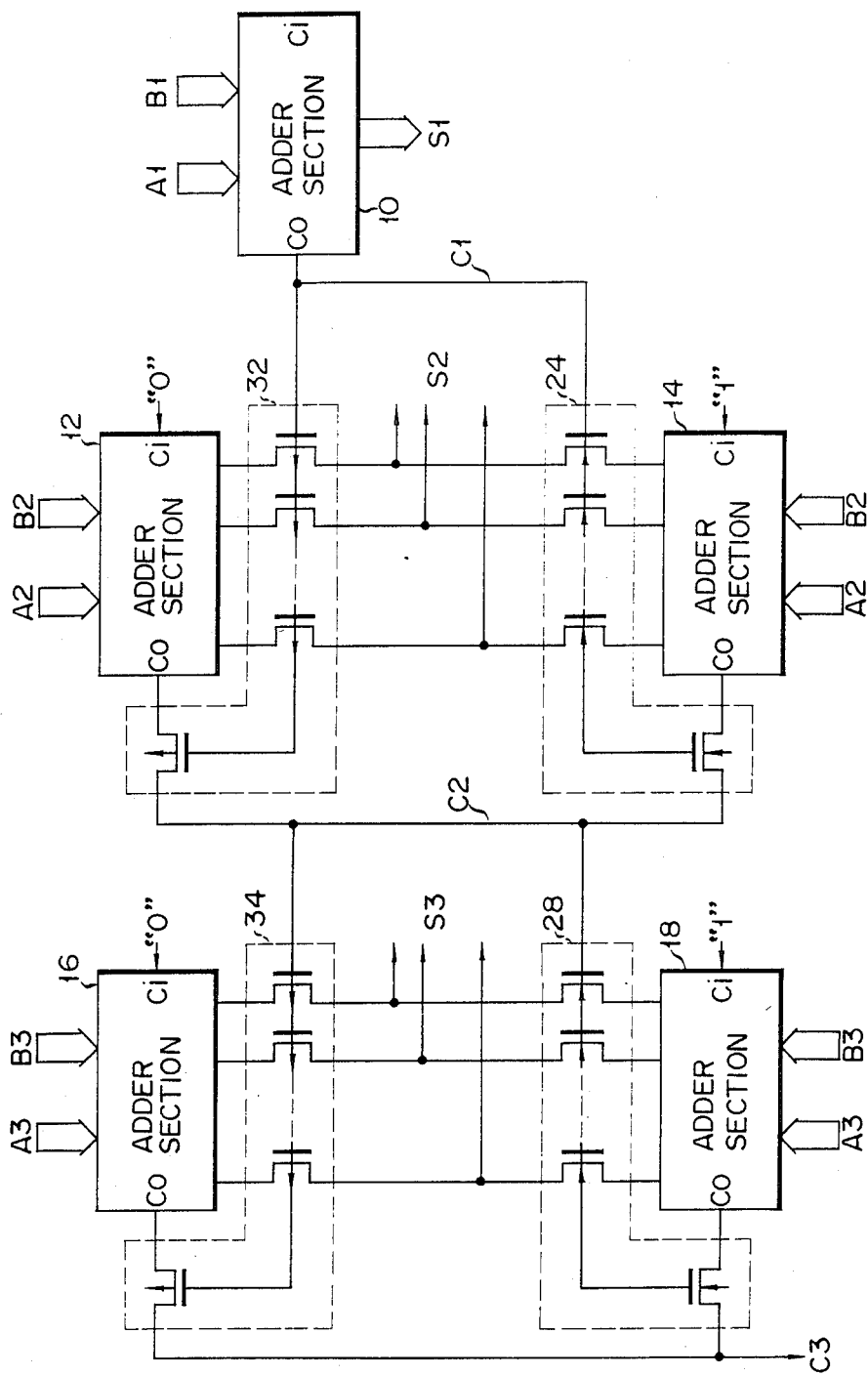
FIG. 3 is a block diagram showing a different embodiment of the invention.

While in the above embodiment the individual adder sections had the same construction, this is by no means limitative. In general, any construction can be employed so long as the two paired adder sections can process data of the same bit length. The uniform division of the input data also is not essential. Further, it is possible to increase the number of input data bits by connecting additional adder sections on the upper bit side of the adder sections 16 and 18. Further, instead of constructing all the gate circuits as N-channel MOSFETs, the gate circuits 22 and 26, which are connected to the adder sections 12 and 16 having the carry input fixed to logic "0", may be constructed as P-channel MOSFET gate circuits 32 and 34 as shown in FIG. 3. With this CMOS circuit construction, the inverters 20 and 30 can be dispensed with.

The relationship between the number of input data bits and the number of data bits in each block in the previous embodiment will now be described. If the number of data bits in each block is too small compared to the number of input data bits, no substantial effect can be obtained with the parallel processing. On the other hand, if the number of data bits in each block is too large, much time is required for the calculation in each block. Therefore, the calculation time cannot be reduced.

Where all the input data consisting of B bits is divided into N divisions each consisting of b bits for parallel calculation, a value of b with which the calculating period is shortest will be analyzed. It is assumed that the calculation period per MOS element stage is the same for the individual elements. This calculation period is assumed to be a standard calculation period. The selecting circuit is assumed to consist of two stages, namely an inverter and a MOSFET transmission gate. Denoting the efficiency of each adder section, i.e., the number of bits divided by the number of the maximum carry propagation stages, by M, the maximum carry propagation stages in each adder section is given as $b/M$. Thus, the number of the maximum carry propagation stages necessary for the addition of input data consisting of B bits, i.e., the calculation period, is $2(N-1)+b/M$. Here $N=B/b$.

Using b as a variable to obtain the minimum value of the number of the maximum carry propagation stages, a minimum value of $2\sqrt{2B/M}-2$ is obtained with $b=\sqrt{2BM}$. When the input data consists of 32 bits and the efficiency of each adder section is $M=1$, the number b of bits in each adder section is $\sqrt{2\times32\times1}=8$ and the number of the maximum carry propagation stages is 14. Thus, by specifying the number B of all bits in the adder circuit and the efficiency M of each adder section (i.e., the number of bits divided by the number of stages), the optimum bit number of each adder section can be obtained. Further, since the number of the propagation stages of the conventional carry look-ahead adder or ripple carry adder is $B/M$, in order for the present embodiment to be advantageous as compared with the prior art, a relationship of $2\sqrt{2B/M}-2<B/M$ must be satisfied. This relationship holds when $B/M\neq2$. Thus, with the circuit according to the invention the calculation speed can be increased when the number of the maximum propagation stages of the adder section is not 2.

When considering the optimum bit number in a circuit having the MOS construction, fan-in and fan-out and a rough value of the stray capacitance must be taken into consideration.

As has been described in the foregoing, according to the invention the input data is divided into a plurality of blocks for parallel processing in a carry look-ahead system, while the selection of carry can be done with the same simple circuit for each block. Thus, it is possible to provide a high speed adder circuit with a simple design.

What is claimed is:

1. An adder circuit comprising:
   first single adder means for receiving first and second input data from a least significant bit up to an Nth bit, wherein N is a predetermined integer, and a first predetermined carry input and for producing a sum of the received first and second input data and said first carry input;
   second adder means for receiving third and fourth input data from an (N+1)th bit up to a most significant bit and a second carry input fixed to logic "0" and for producing at its output terminal a sum of the received third and fourth input data and said second carry;
   third adder means for receiving said third and fourth input data and a third carry input fixed to logic "1" and for producing at its output terminal a sum of the received third and fourth input data and said third carry, said second and third adder means each including a plurality of adder means, the first and second input data from the (N+1)th bit up to the most significant bit being respectfully divided into a plurality of bit blocks each having N bits, and said second and third adder means each comprising at least one adder having the same construction as said first single adder means; and
   selector means connected to said output terminals of said second and third adder means for selectively providing the sum and carry from the previous adder stage outputs of either one of said second and third adder means according to a fourth carry, said selector means including a plurality of identical gate circuits and being connected to said respectives adder means.

2. An adder circuit according to claim 1, in which said selector means includes first N-channel MOS transmission gates each having a gate terminal, to which the carry output of the next lower bit side adder means is supplied through inverters, and first terminals, to which each bit of (sum) terminals and a carry output terminal of said second adder means are respectively connected, and second N-channel MOS transmission gates each having a gate terminal, to which the carry output of the next lower bit side adder means is supplied, and first terminals, to which each bit of sum terminals and a carry output terminal of said third adder means are respectively connected, second terminals of said first and second MOS transmission gates corresponding to one another being commonly connected.

3. An adder circuit according to claim 1, in which said selector means includes P-channel MOS transmission gates each having a gate terminal, to which the carry output of the next lower bit side adder means is supplied, and first terminals, to which each bit of sum terminals and the carry output terminal of said second adder means are respectively connected, and N-channel MOS transmission gates each having a gate terminal, to which the carry output of the next lower bit side adder means is supplied, and first terminals, to which each bit of sum terminals and a carry output terminal of said third adder means are respectively connected, second terminals of said P-channel and N-channel MOS transmission gates corresponding to one another being commonly connected.

4. An adder circuit according to claim 1, in which when the number of bits of said first and second input data is denoted by B and the number of bits in each said adder means divided by the maximum number of carry propagation stages in said adder means is denoted by M, and the number of bits in each adder means is set to an integral number close to $2\sqrt{2BM}$, the maximum number of carry propagation stages for the most significant bit of the input data is set to the smallest integral number close to $\sqrt{2B/M} - 2$.

5. An adder circuit according to claim 1, in which each said adder means consists of a carry look-ahead system adder.

* * * * *